United States Patent Office 2,693,199
Patented Nov. 2, 1954

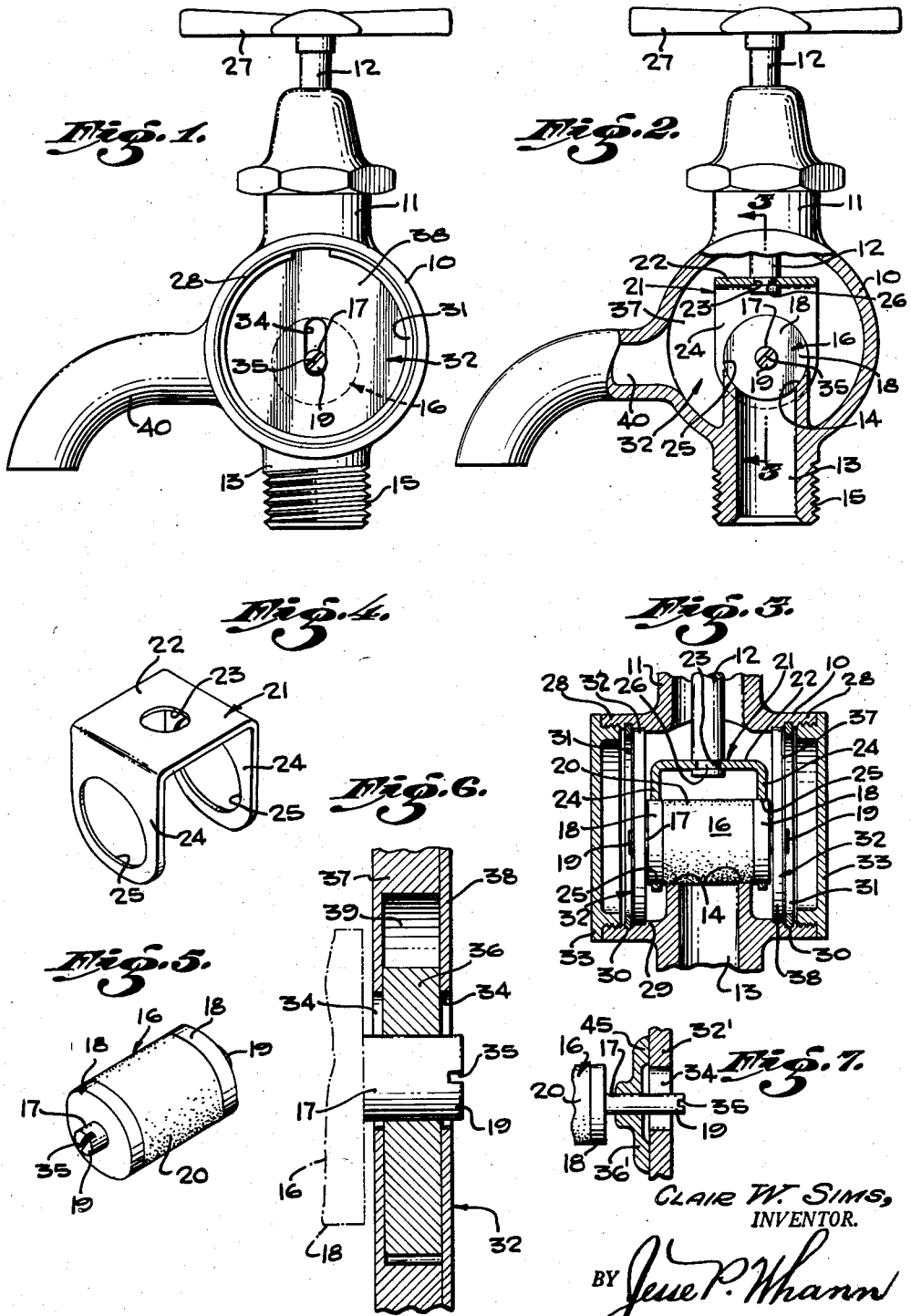

2,693,199

RENEWABLE VALVE

Clair W. Sims, Redondo Beach, Calif.

Application September 15, 1952, Serial No. 309,580

7 Claims. (Cl. 137—329.05)

This invention relates to valve construction and relates in particular to the provision of means whereby the closure part which cooperates with the seat of the valve may be renewed or replaced without the necessity of shutting off the supply of water to the valve so that it can be dismantled for the purpose of changing the closure element which is generally in the form of a washer.

It is an object of the invention to provide a valve device having a closure which rotates on a transverse axis so that different closure surfaces may be brought into cooperative relation to the valve seat, and having means whereby this closure may be rotated from one position to another when a side plate in the valve housing is removed from its normal position.

It is an object of the invention to provide a valve of the character described in the foregoing wherein the closure is a volume of generation around a transverse axis, for example, a sphere or a cylinder, or other form resulting from the revolution of a plane figure around an axis, and in which valve the valve seat is shaped to conform to a portion of the surface of the closure which is arranged to engage the valve seat.

It is an object of the invention to provide a valve device of this character wherein the valve body has a removable plate arranged to expose a chamber in the valve body, in which chamber a closure adjusting member is exposed for operation. It is a feature of the device that a portion of the adjusting member passes through an interior wall of the valve body which is larger than the projecting portion so as to provide for a movement of the closure necessary for its ordinary operation, there being a novel sealing means operative between this internal wall and the adjusting member which will permit movement of the adjusting member.

A further object of the invention is to provide a seal for the adjusting member which projects through the internal wall, which seal consists of a flat wall of resilient material disposed so as to have sliding movement along the face of an internal wall having a slot therein for the accommodation of the portion of the adjusting member which passes therethrough into the chamber which is provided in the valve body.

A further object of the invention is to provide a valve with adjusting means of the character described in the foregoing having cover plates on the opposite sides of the valve body arranged, when removed to disclose chambers in which adjusting means for the closure are exposed for operation, thereby making the valve device suitable for use in locations where either one of the sides thereof are so close to an obstructing wall as to make operation of the adjusting means from that side difficult or not feasible.

Further objects and advantages of the invention may be brought out in the following part of the specification wherein I have described a simple form of the invention in detail for the purpose of enabling others to practice the invention, without limiting the scope of the invention set forth in the appended claims.

Referring to the drawing which is for illustrative purposes only:

Fig. 1 is a side view of a preferred embodiment of the invention;

Fig. 2 is a side view similar to Fig. 1, with parts thereof in section to show internal construction;

Fig. 3 is a fragmentary cross section taken as indicated by the line 3—3 of Fig. 2;

Fig. 4 is a perspective view of the closure supporting yoke of the faucet;

Fig. 5 is a perspective view of the rotatable closure;

Fig. 6 is an enlarged fragmentary sectional view also taken on the plane indicated by the line 3—3 of Fig. 2;

Fig. 7 is a fragmentary sectional view showing an alternative for the arrangement shown in Fig. 6.

The preferred form of the invention shown in the drawings includes a cylindrical valve body 10 having an upwardly extending bonnet 11 through which a valve stem 12 projects in the customary manner. The lower part of the valve body 10 has a tubular inlet member 13, the internal portion of which is formed so as to provide a valve seat 14 corresponding to a portion of a cylinder, and the external portion of which has threads 15 whereby it may connected to a fluid supply pipe.

A cylindrical closure member 16 is arranged to cooperate with the seat 14. As shown in Figs. 2, 3 and 5, this closure member 16 comprises an axial pin or shaft 17 having circular collars 18 adjacent the ends 19 thereof. Between the collars 18 there is a cylindrical closure body 20 which may be made of a suitable material such as rubber, rubber compound, plastic or the like. The cylindrical external surface of this closure body 20 corresponds to that of the valve seat 14 so that when the closure members 16 is positioned as shown in Figs. 2 and 3 entry of water from the inlet 13 into the cylindrical valve body 10 will be prevented.

Movement of the closure member 16 vertically with relation to the valve seat 14 is accomplished by use of a yoke 21 which is connected to the lower end of the stem 12, the yoke 21 has an upper transverse plate portion 22 with a centralized opening 23, and downwardly extending sides 24 provided with openings 25 to receive the discs or collars 18 of the closure member 16. The opening 23 in the upper portion of the yoke 21 receives the neck portion 26 constituting the lower end of the stem 12, in rotatable relation so that as the stem 12 is raised and lowered in the customary manner, for example in response to rotation applied through a handle 27, only vertical movement will be transmitted to the yoke 21 to raise or lower the closure member 16 as may be required in the operation of the valve.

The oppositely faced open ends 28 of the cylindrical body 10 has internal substantially shoulders 29 spaced inwardly from internal grooves arranged to receive snap rings 31, whereby disc or plate members 32 are non-rotatably held in positions to obstruct the ends 28 of the cylindrical body 10. The internally threaded extremities of the body ends 28 are closed by threaded cover plates 33 as shown in Fig. 3. Each of the plates 32 has therein a vertical slot 34 through which an end 19 of the pin 17 projects, and the ends of the projections 19 are provided with transverse slots 35 whereby they may be engaged by a screw driver to rotate the closure 16 to a new position. To resist escape of liquid through the slots 34 washer means 36 are provided as shown in Fig. 6. Each of the plates 32 is comprised of two cooperating parts 37 and 38 formed so as to provide a cavity 39 surrounding the pin end 19, Fig. 6, and arranged to receive the washer 36 so that it may slide up and down as the pin end 19 moves vertically in the slot 34. These slots 34 also have the function of maintaining alignment of the closure 16 with the seat 14.

The cylindrical body 10 is provided with an outlet member 40 which may be arranged for connection to piping if desired. However, in the present form of the invention the outlet member 40 is arranged to deliver fluid to the exterior in the manner of a bibb or faucet. When renewal of the operative surface of the closure 16 is desired, one of the closure plates 33, Fig. 3, is removed. Then the handle 27 is operated so as to raise the closure only just enough to clear the valve seat 14. There will be a small flow of water from the inlet 13 into the valve body 10, but this water will readily escape through the outlet 40. At this time rotation is applied to the closure 16 by application of a screw driver to the slot 35 in the pin end 19, to bring a new portion of a closure body 20 of the closure member 16 into a position facing the valve seat 14. In Fig. 7, I show a simple arrangement whereby the formation of a cavity 39 in the plate 32 may be avoidd. A portion of a plate 32' is shown having therein a vertical slot 34 through which a pin end 19 projects. A washer member 36', having a function corresponding to that of the washer 36, Fig. 6, is placed on the pin end 19 between the adjacent collar 18 and the plate 32'. This washer 36' has a resilient lip portion 45 for sealing engagement with the adjacent surface of the plate 32', whereby escape of fluid through the slot 34 will be prevented when the cover plate lying outside the plate 32' is removed.

I claim:

1. In a valve of the character described: a closure arranged to be rotated on an axis disposed in transverse relation to its fluid flow controlling line of bodily movement; pins projecting axially from said closure through which rotation may be transmitted to said closure; a valve body provided with a wall having an opening therethrough to receive said pin, said opening being enlarged so as to permit movement of said stem in a direction corresponding to said line of movement of said closure; sealing means for said pin closing said opening around said pin and being arranged for movement along said wall when said pin is moved in said direction; a valve seat in said body formed and disposed so as to be closed by a portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

2. In a valve of the character described: a closure arranged to be rotated on an axis disposed in transverse relation to its fluid flow controlling line of bodily movement, said closure being a cylinder and having the surface portion thereof formed of a material yieldable character; a pin projecting axially from said closure through which rotation may be transmitted to said closure; a valve body provided with a wall having an opening therethrough to receive said pin, said opening being enlarged so as to permit movement of said pin in a direction corresponding to said line of movement of said closure; sealing means for said pin closing said opening around said pin and being arranged for movement along said wall when said pin is moved in said direction; a cylindrically curved valve seat in said valve body positioned so as to be engaged by a part of the surface portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

3. In a valve of the character described: a closure arranged to be rotated on an axis disposed in transverse relation to its fluid flow controlling line of bodily movement; a pin projecting axially from said closure through which rotation may be transmitted to said closure; a valve body provided with a wall having an opening therethrough to receive said pin, said opening being enlarged so as to permit movement of said pin in a direction corresponding to said line of movement of said closure, said body having an outlet disposed below said opening of said wall so that water will flow out through said outlet before it reaches the level of said opening; a valve seat in said body formed and disposed so as to be closed by a portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

4. In a valve of the character described: a closure arranged to be rotated on an axis disposed in transverse relation to its fluid flow controlling line of bodily movement, said closure being a cylinder and having the surface portion thereof formed of a material yieldable character; a pin projecting axially from said closure through which rotation may be transmitted to said closure; a valve body provided with a wall having an opening therethrough aligned with said pin, said opening being enlarged in a direction corresponding to said line of movement of said closure, said body having an outlet disposed below said opening of said wall so that water will flow out through said outlet before it reaches the level of said opening; a cylindrically curved valve seat in said valve body positioned so as to be engaged by a part of the surface portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

5. In a valve of the character described: a closure arranged to be rotated on an axis disposed in transverse relation to its fluid flow controlling line of bodily movement; a pin projecting axially from said closure through which rotation may be transmitted to said closure; a valve body provided with a wall having an opening therethrough aligned with said pin, said opening being enlarged in a direction corresponding to said line of movement of said closure; a washer on said pin of a size larger than said opening in said wall and having sliding engagement with said wall so as to move thereon when said closure is moved bodily; a valve seat in said body formed and disposed so as to be closed by a portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

6. In a valve of the character described: a closure arranged to be rotated on an axis disposed in transverse relation to its fluid flow controlling line of bodily movement; pins projecting axially from said closure through which rotation may be transmitted to said closure; a valve body provided with a wall having openings therethrough to receive said pins being enlarged so as to permit movement of said stem in a direction corresponding to said line of movement of said closure; sealing means for said pins closing said openings around said pins and being arranged for movement along said wall when said pins are moved in said direction; a valve seat in said body formed and disposed so as to be closed by a portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure.

7. In a valve of the character described: a closure arranged to be rotated on an axis disposed in transverse relation to its fluid flow controlling line of bodily movement; a pin projecting axially from said closure through which rotation may be transmitted to said closure; a valve body provided with a wall having an opening therethrough aligned with said pin, said opening being enlarged in a direction corresponding to said line of movement of said closure; sealing means for said pin closing said opening around said pin and being arranged for movement along said wall when said pin is moved in said direction; a valve seat in said body formed and disposed so as to be closed by a portion of said closure; means operative to move said closure along said line of movement toward and away from said valve seat; and a removable cover means arranged to be secured to said valve body in a position to conceal said wall, removal of said wall permitting access to said pin for rotation thereof to rotate said closure to a new position.

References Cited in the file of this patent

UNITED STATES PATENTS

| Number | Name | Date |
| --- | --- | --- |
| 109,730 | Hanks | Nov. 29, 1870 |
| 1,157,641 | Fisher | Oct. 19, 1915 |
| 1,157,642 | Fisher | Oct. 19, 1915 |
| 1,483,656 | Fisher | Feb. 12, 1924 |
| 2,439,110 | Strike | Apr. 6, 1948 |